(12) United States Patent
Powers

(10) Patent No.: US 7,167,678 B2
(45) Date of Patent: Jan. 23, 2007

(54) PERSISTENT PEER-TO-PEER NETWORKING OVER A PICONET NETWORK

(75) Inventor: Simon Powers, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 569 days.

(21) Appl. No.: 10/322,188

(22) Filed: Dec. 18, 2002

(65) Prior Publication Data
US 2004/0203378 A1    Oct. 14, 2004

(51) Int. Cl.
*H04B 7/00* (2006.01)
(52) U.S. Cl. ..................... 455/41.2; 514/444
(58) Field of Classification Search ............ 455/41.2, 455/41.1, 444, 41.3, 514, 500, 553.1; 370/338, 370/345, 350; 709/209
See application file for complete search history.

(56) References Cited

U.S. PATENT DOCUMENTS

| | | | |
|---|---|---|---|
| 6,192,230 B1 * | 2/2001 | van Bokhorst et al. .. | 455/343.3 |
| 6,590,891 B1 * | 7/2003 | Jacquet et al. ............. | 370/350 |
| 6,775,258 B1 * | 8/2004 | van Valkenburg et al. .. | 370/338 |
| 2001/0002906 A1 * | 6/2001 | Rune .......................... | 370/345 |
| 2002/0055978 A1 * | 5/2002 | Joon-Bo et al. ............ | 709/209 |
| 2002/0116460 A1 * | 8/2002 | Treister et al. ............. | 709/204 |
| 2002/0159401 A1 | 10/2002 | Boger ........................ | 370/294 |
| 2003/0012219 A1 | 1/2003 | Joo ............................. | 370/449 |

* cited by examiner

*Primary Examiner*—Matthew Anderson
*Assistant Examiner*—Tan Trinh
(74) *Attorney, Agent, or Firm*—Woodcock Washburn LLP

(57) ABSTRACT

A persistent peer-to-peer network is implemented over a network with master-slave topology. Data being sent from master to slave or from slave to master are sent in one transmission, but data sent from one slave to another is received by the master and retransmitted to the slave. A session table is kept at each device includes an ordered list of devices, where the first device is the master device. When a master device drops out of the network the slave devices promote the next device in the ordered list of devices to master. A master device may also receive a request from a slave device to become master, and update its session table and send the updated session table to all devices. The slave device requesting master status is then treated as master by all devices in the network.

16 Claims, 8 Drawing Sheets

PERSISTENT PEER-TO-PEER NETWORKING OVER A PICONET NETWORK

FIELD OF THE INVENTION

The present invention is directed to methods and systems for implementing support for peer-to-peer networking over a network that uses a master-slave topology. More particularly, the present invention relates to the implementation of master migration to support persistent peer-to-peer support over a Bluetooth piconet or similar network.

BACKGROUND OF THE INVENTION

Bluetooth is a wireless technology standard, designed to eliminate the need for cabling between devices. Bluetooth supports a network topology known as piconet. In a piconet, a single device, for example a printer, laptop, or network access point, acts as a master device. All other devices in the piconet network are slave devices. A slave device communicates only with the master device, and each slave device may only be connected to one master device at any one time.

A device may assume either the master or the slave role when establishing a piconet. For example, when a personal data assistant (PDA) connects to a printer via a piconet, it is likely the PDA will take the slave role, allowing the printer to be the master. This allows the printer to have simultaneous connections with other devices requiring its services. However, when the PDA connects with other PDAs, it might establish a new piconet and assume the master role in order to share files with more than one other PDA. The master/slave topology has limitations. For example, this topology does not innately allow persistent or peer-to-peer networking, which may be necessary for some applications.

For example, interactive network game applications support players on different devices joined over a network. Such game applications are generally written based on the assumption that a peer-to-peer network exists which allows every device in the session to communicate directly with every other device. Bluetooth piconet and other master-slave topologies allow indirect communication between slaves through the master, but do not support peer-to-peer communication. Slaves in a piconet network communicate only with the master device, therefore two slaves can not communicate directly.

Moreover, master-slave topologies do not have inherent support for persistency, which may be necessary for interactive network applications such as games. Each of the players in a network game may have a widely varying participation time. While the game session is ongoing, some players may quit the game and others may join. Reliance on one device to be a master, with the resulting single point of failure for all communication on the network, can not be used for an application such as an interactive network game which requires a persistent network even while some devices quit and others join the network. If a master-slave network is used, the master device must be the last to leave the network, or the interactive network game session will end prematurely.

In view of the foregoing, there is a need for a technique that overcomes the drawbacks of the prior art.

SUMMARY OF THE INVENTION

A persistent peer-to-peer network is implemented over a network with master-slave topology. Data being sent from master to slave or from slave to master are sent in one transmission, but data sent from one slave to another is received by the master and retransmitted to the slave. A session table is kept at each device includes an ordered list of devices, where the first device is the master device. When a master device drops out of the network the slave devices promote the next device in the ordered list of devices to master. A master device may also receive a request from a slave device to become master, and update its session table and send the updated session table to all devices. The slave device requesting master status is then treated as master by all devices in the network.

Other features and embodiments of the present invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
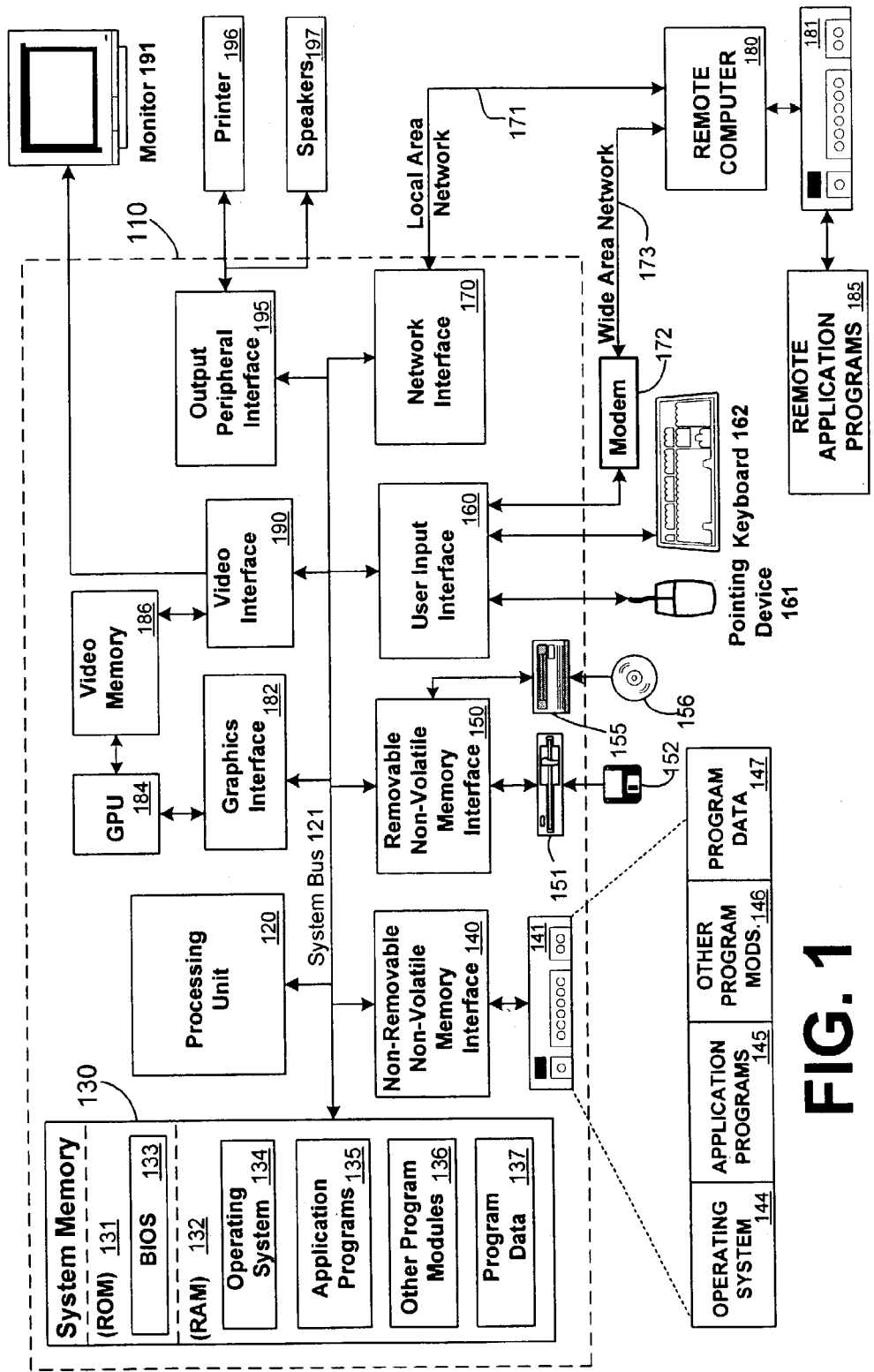
FIG. 1 is a block diagram representing an exemplary non-limiting computing system in which the present invention may be implemented.

A persistent peer-to-peer network is implemented over a network whose physical topology is master/slave, in which one device is the master device and each other device communicates only with the master device. Through master migration, persistence is achieved in the resulting network, and through retransmission of slave-to-slave transmissions, a peer-to-peer network can be created over the underlying physical master/slave toplology.

In one embodiment, a persistent peer-to-peer (PP2P) network is implemented using an underlying master-slave network such as a Bluetooth piconet network. In order for an application running on a sending device to transmit data to a destination device, the sending device communicates the data and destination device identity to the PP2P layer. When data is received by an application from the PP2P layer, it includes the data and the identity of the sending device. The PP2P layer creates a peer-to-peer topology between participants in the network by negotiating the transmission of data through the underlying master-slave topology in a manner that is transparent to applications that use the PP2P layer.

At the PP2P layer of a slave device, when data is received from the application to be sent to a destination, a packet is created including a packet address (in this case the address of the device for which the data is destined), and packet data (the data to be transmitted). This packet then transmitted via the master-slave network over the only connection a slave device has—the connection to the master device. The PP2P layer at the master device, upon receipt of the packet from the underlying master-slave network, inspects the packet. If the packet address indicates that the master is the destination device, the PP2P layer publishes the sending device address and the packet data to the application layer. If the packet address indicates that another slave device is the destination device, the packet is sent to that slave device, with the packet address changed to the sending device's address. The sending device address is determined by the master through its knowledge of the connection the packet was recevied on, since each connection to the master is uniquely paired with a single slave device.

In order for an application running on a master device to transmit data, a packet is created with the packet address set to the master device's address and the packet data set to the desired data to be sent. This packet is sent to the recipient device. Thus any packet received at a slave device contains the address of the originating device, and a packet received at the master device contains the address of the intended recipient device.

The persistence of the network is made possible through master migration. A session table is kept in which is an ordered list of devices on the network. The first device in the ordered list is the master device. When a new device joins the network, it contacts the master, and the master updates the session table by adding the identity (e.g. the network address) of the new device to the end of the session table. The session table is then sent to each device on the network.

When a master device quits the network (for example, in a gaming context, when a game player using a device which is the master device leaves the game), each slave device detects that the master device has terminated the connection. Each slave device removes the master device's identity from the ordered list in the session table. The next device identity in the ordered list in the session table is then promoted to the master device slot. If this device identity identifies the slave device itself, the slave device begins acting as a master device. It accepts connections from other devices, updates the session table, and acts as a conduit for (and recipient of) peer-to-peer messages. If the device identity in the master device slot identifies another device, the slave device attempts to make a connection to the new master. When a successful connection is made, the slave device receives and sends peer-to-peer messages to or via the new master. A request for master status by a slave device is similarly enabled.

Exemplary Computing Device

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer system 110. A monitor 191 or other type of display device is also connected to the system bus 121 via an interface, such as a video interface 190, which may in turn communicate with video memory 186. In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, the MICROSOFT NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and requesting object, such that operation according to the invention may be performed by, supported in or accessed via all of NET's languages and services, and in other distributed computing frameworks as well.

Persistent Peer-To-Peer Implemented over Bluetooth Piconet

The inventive persistent peer-to-peer network is implemented over a master/slave based network such as Bluetooth piconet. Bluetooth is a protocol which allows short-range radio links to replace cables between electronic devices. Bluetooth is considered useful for mobile devices that need sporadic contact with each other. A Bluetooth piconet is collection of devices connected via Bluetooth technology in a master-slave topology. All Bluetooth devices are peer units and have identical Bluetooth implementations. However, when establishing a piconet, one unit will act as a master, and the other units will be slaves. Slave devices communicate only with the master device.

Before any connections in a Bluetooth piconet are created, all devices are in a standby mode. In this mode, an unconnected unit periodically "listens" for messages. A connection message to create a piconet is initiated by any of the devices, which then takes on a role (either master or slave) in the piconet thus created.

Figure 2:
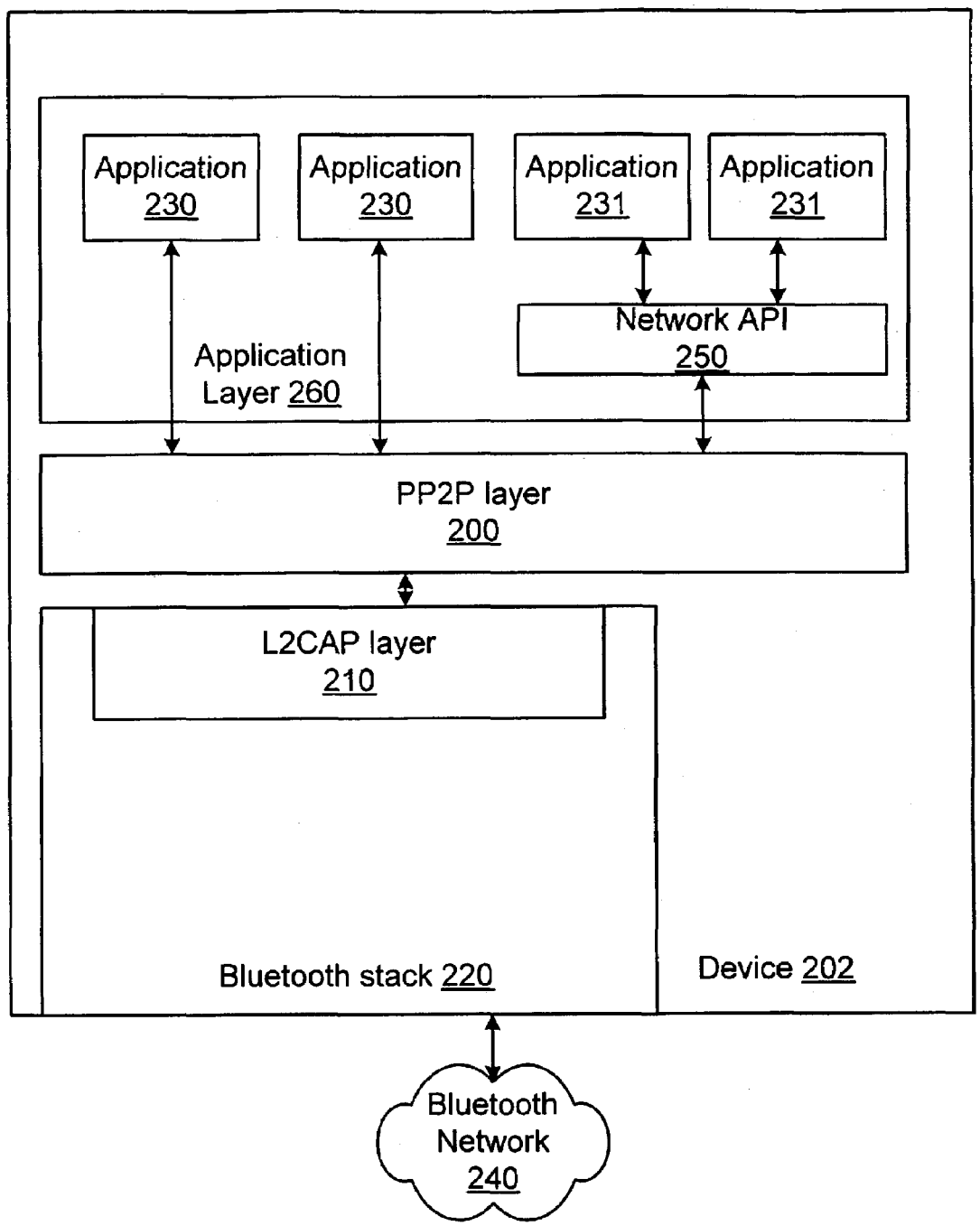
FIG. 2 is a block diagram representing part of an exemplary non-limiting computing system according to one embodiment of the invention.

As shown in FIG. 2, Bluetooth is implemented with a conventional Bluetooth stack 220 present inside a device 202. (The "stack" is a set of "layers" leading up from the physical communications medium (a radio-frequency antenna, in the case of Bluetooth) to the L2CAP layer described below. The model of networks that are built in "layers" is known in the art, and thus is not described at length herein.) The Bluetooth stack 220 communicates with Bluetooth network 240. According to an embodiment of the invention, a persistent peer-to-peer (PP2P) network layer 200 within a device 202 communicates with the traditional Bluetooth stack 220. Specifically, PP2P layer 200 communicates with the logical link control and adaptation protocol (L2CAP) layer 210. L2CAP layer 210 is the adaptation layer of the Bluetooth stack 220.

Software running in the application layer 260 communicates with the Bluetooth stack 220 and thus the Bluetooth network 240 via the PP2P layer 200 in order to gain access to the network 240. The application layer may include one or more applications 230 which communicate directly with the PP2P layer 200, and/or one or more applications 231 which communicate to the PP2P layer 200 via network API 250.

In another embodiment, not pictured, the PP2P layer is integrated into an application, and that application communicates directly with the L2CAP layer 210. In another embodiment, the PP2P layer is integrated into an existing network API which intermediate between applications and the L2CAP layer 210.

Device 202 can function either as a master or a slave in the Bluetooth piconet network. The PP2P layer 200, used together with the Bluetooth stack 220 and network 240 provides the function of a persistent peer-to-peer network to the applications 230 and the network API 250, using the master-slave topology of the underlying Bluetooth piconet network. The PP2P layer receives packets from the Bluetooth network, sends packets on the Bluetooth network, and manages the PP2P network which is built on the underlying Bluetooth network.

Initiation of PP2P Network

When an application 230 decides to initiate a PP2P network, a request is sent to the PP2P layer 200 to create a PP2P network. The PP2P layer 200 uses the Bluetooth stack 220 to initiate a Bluetooth piconet network by listening for new connections over the Bluetooth network. The PP2P layer 200 also creates a session table, which contains an ordered list of devices on the PP2P network and an update counter value. A device is identified through its Bluetooth address, the 48 bit value that is unique to the associated Bluetooth adaptor hardware. The update counter value is initialized to 1. As described below, the update counter value is increased every time the table is updated, and thus helps to identify the most recent version of the session table.

When a second device decides to join the PP2P network, the request to join the PP2P network is received by the master device via the Bluetooth stack 220. At the master device, acting under the control of the PP2P layer 200, the Bluetooth stack 220 sets up a connection between device 202 as a master device, and the second device, which will act as a slave device. At the same time, the PP2P layer 200 adds the second device's identity to the session table, increases the update value, and sends this new session table, in a session table update message, to all devices connected to the PP2P network. The PP2P layer 200 also publishes that the new device has joined to the application layer 260. Each new device that joins the network causes a session table update to created by the master device and sent to all slave devices on the network.

Communications Between PP2P Devices

Data to be sent and recipient identity information is received from the application layer by the PP2P layer. On the other end of a transmission, when information is received by the PP2P layer for publication to the application layer, data and sender identity information is published. Information sent between PP2P layers of devices via the underlying master/slave network comprises packets which include a packet address and packet data.

When a packet is sent by the PP2P layer of a slave device to a master device, the packet address is the address of the intended recipient. When a packet is received by the PP2P layer of a slave device from the master device, the packet address is the address of the sender. The PP2P layer knows whether device it is resident in is acting as master or slave in the underlying master/slave network. The PP2P layer in a device acting as a slave device passes the data received from the application layer to the Bluetooth stack for transmission to the master device, and passes data received in the packet to their application layer.

The PP2P layer in a device acting as master has a more complicated role. A master device may be receiving data intended for the master device or data intended for another device. When a transmission is sent from a slave to a master, the master device receives the packet, reads the packet address, determines whether it is intended for the master device, and, if it is, publishes the originator's address and packet data to the application layer.

Figure 3:
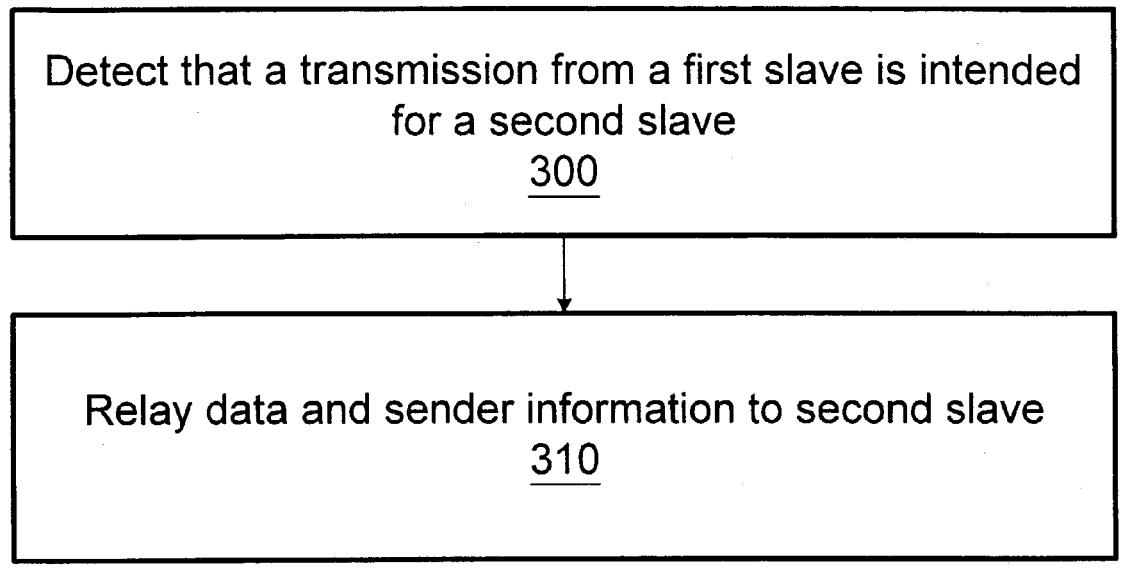
FIG. 3 is a flow diagram representing a method of implementing data transmission according to one embodiment of the invention.

On the other hand, a packet received by the master may actually be destined for another slave device, since slave-to-slave transmissions involve two Bluetooth transmissions one from the originating slave to the master, and another from the master to the destination slave. Any transmission by a slave device is sent to the master device. When a slave sends a transmission intended for another slave, as seen in FIG. 3, the master detects that the packet from the sender slave contains the address of a slave as the packet address in step 300. The master then changes the packet address to the address of the originator of the message and sends the packet to the recipient slave, step 310.

Transmissions that originate at the master device may also be sent to a slave device. When a transmission is sent from a master to a slave, the recipient packet address received from the application layer at the master is changed to the master's address (as the originator of the message) and the packet sent to the recipient address.

Figure 5A:
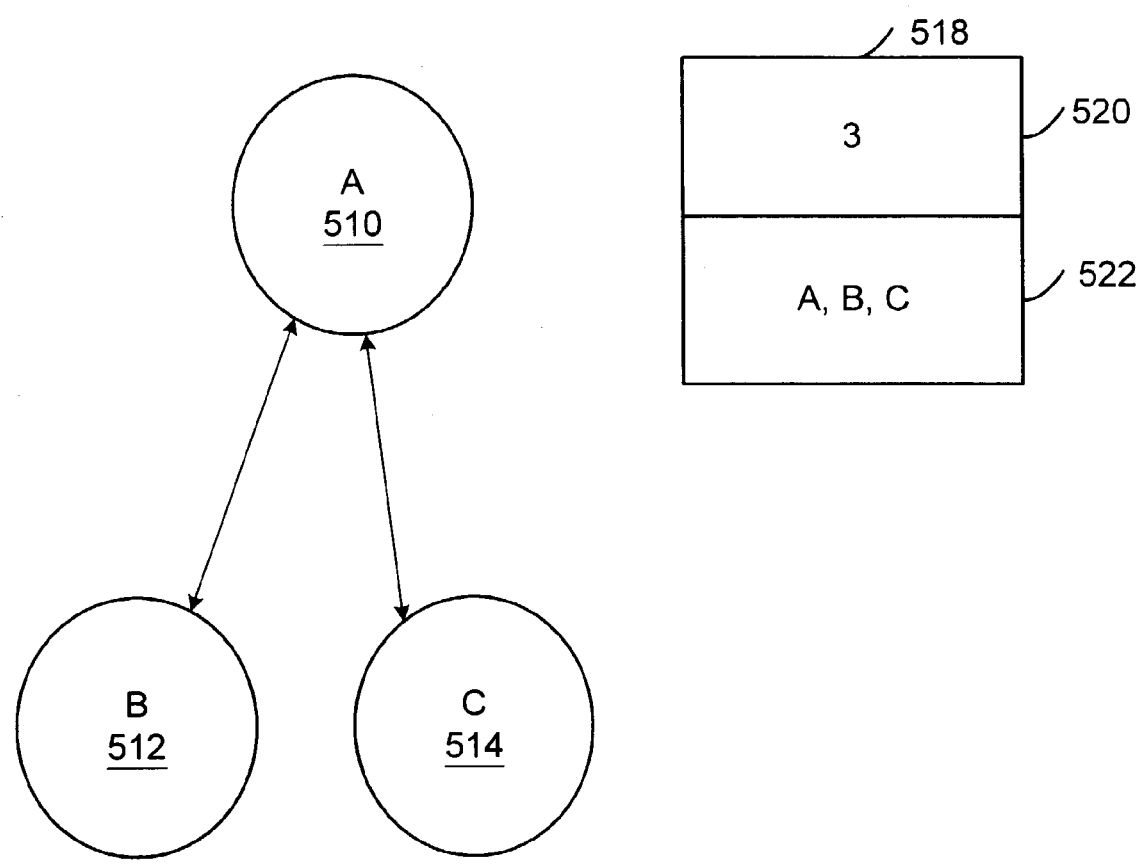
FIGS. 5a through 5d are block diagrams representing exemplary stages of the underlying master/slave network and session table contents as device joining and leaving a network according to one embodiment of the invention.
Figure 5B:
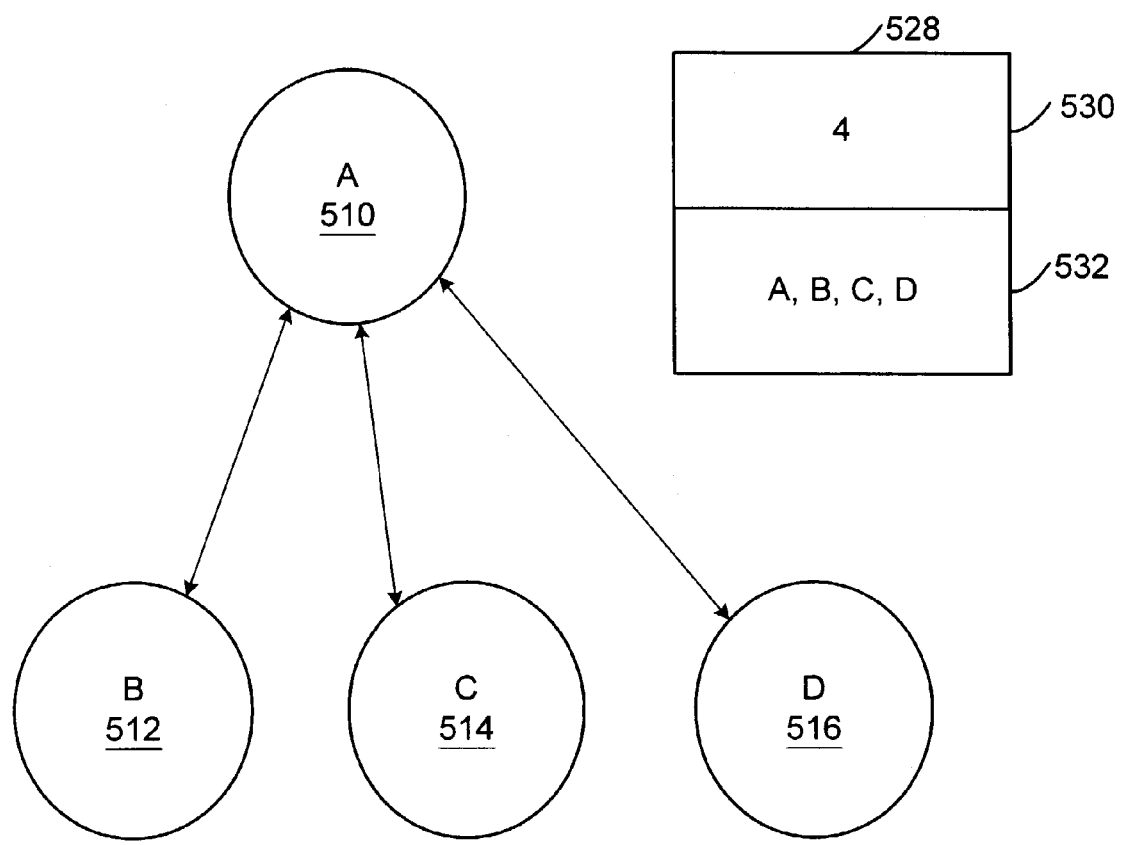

The contents of packets exchanged by the PP2P layers of different devices are described in Table 1:

FIGS. 5a through 5d show the underlying master/slave network and session table in different exemplary stages of a peer-to-peer network where a new slave joins and a master exits. As shown in FIG. 5a, a network with master device A 510, and slave devices B 512 and C 514 has session table 518, including the update value 520 set to 3 and the ordered list of devices 522: A, B, C. A copy of the session table is stored on each of the devices A, B, and C. As shown in FIG. 5b, when a new device D 516 joins the network, it is connected to master device A 510. The new session table 528 now contains update value 530 set to 4, and ordered list of devices 532: A, B, C, D. The new session table 528 is created by A 510 and sent to each of the slave devices.

Figure 5C:
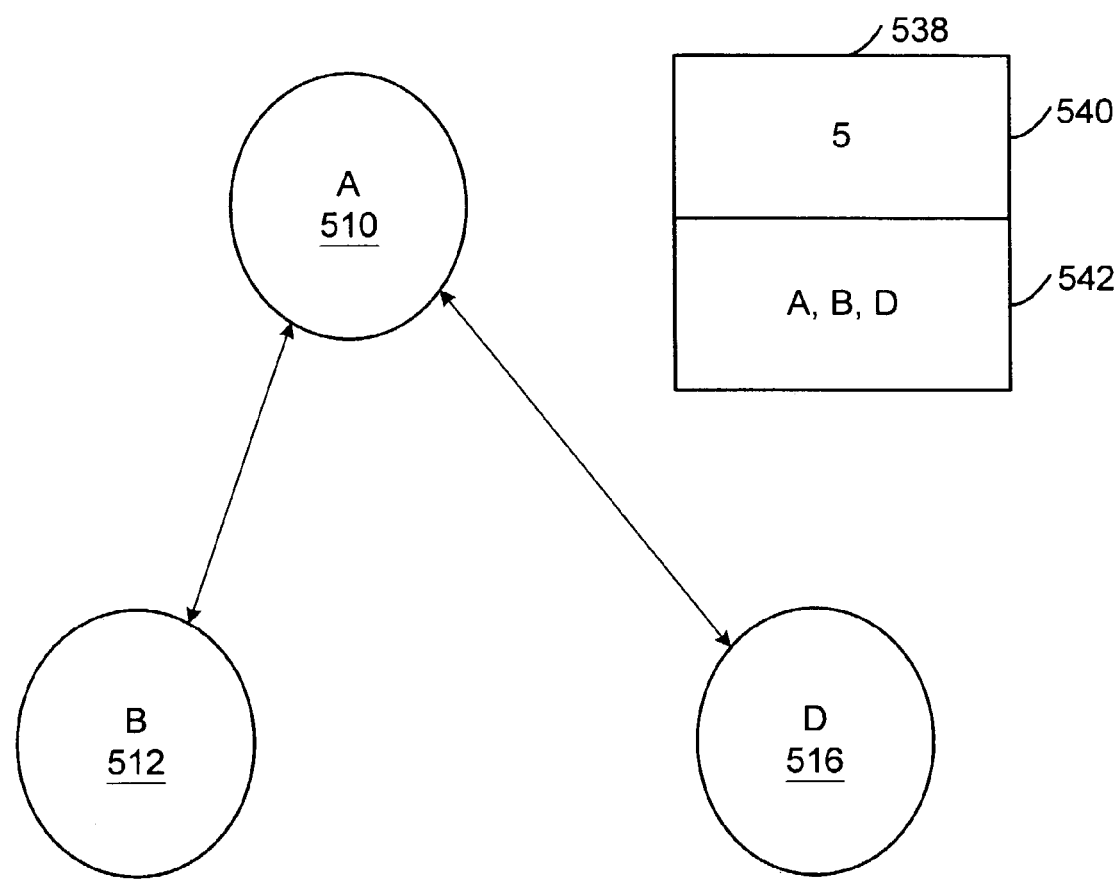

If slave C 514 were to quit the network shown in FIG. 5b, the network shown in FIG. 5c would result. When master device A 510 detects that C 514 is no longer in the network, it updates the session table. New session table 538 would include an updated update value 540, set to 5 (since one update has occurred since the last session table). It would also include the updated ordered list of devices 542: A, B, D. Master device A 510 then would create and send this session table update to the slave devices B 512 and D 516.

Figure 5D:
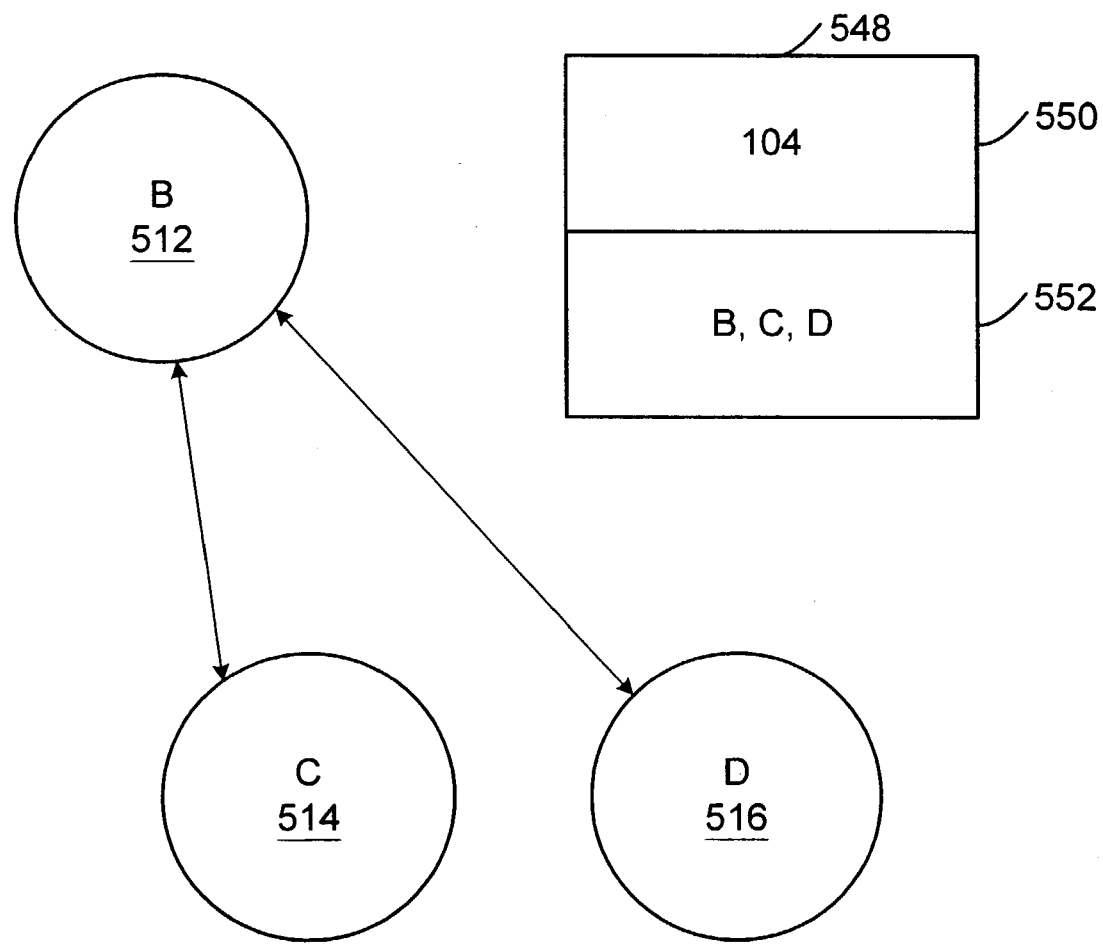

If, instead of slave C 514 quitting the network shown in FIG. 5b, master A 510 quits, then the resulting state is that shown in FIG. 5d. In FIG. 5b, the slave devices B 512, C 514, and D 516, upon detecting that the master device has quit the network each delete the identity of master A 510 from the ordered list in their local copy of the session table.

TABLE 1

Contents of Packets In Various Transmissions

| Type of Transmission | First Packet Sent From | First Packet Sent To | Contents of Packet Address in First Packet | Second Packet Sent Form | Second Packet Sent To | Contents of Packet Address in Second Packet |
|---|---|---|---|---|---|---|
| Master to Slave | Master | Slave | Master | N/A | N/A | N/A |
| Slave to Master | Slave | Master | Master | N/A | N/A | N/A |
| Slave1 to Slave2 | Slave1 | Master | Slave2 | Master | Slave2 | Slave1 |

As can be seen, when a slave receives a packet, the address in the packet is the address of the sending device. When a slave sends a packet, the address in the packet is the address of the intended recipient.

Master Migration

Figure 4:
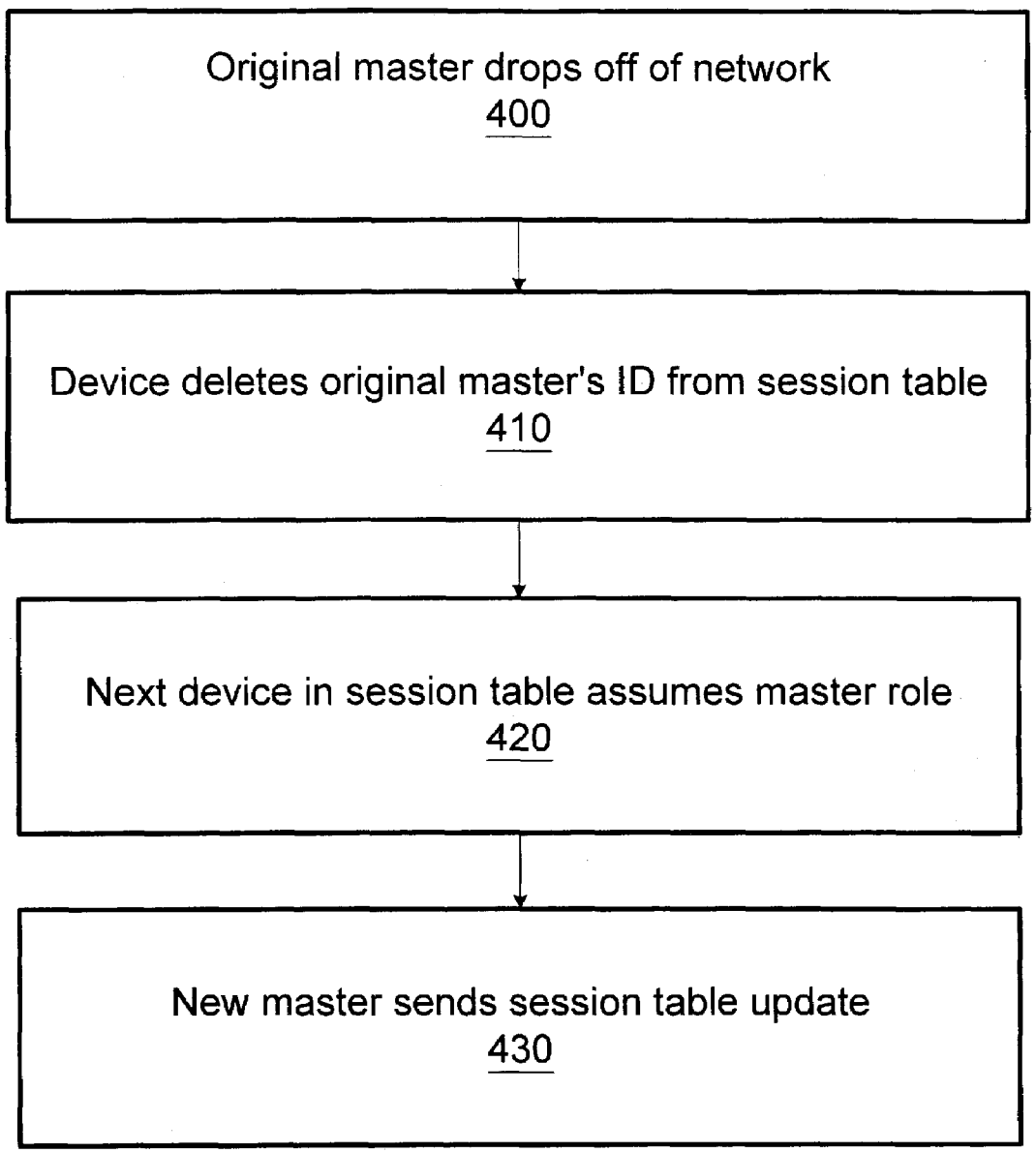
FIG. 4 is a flow diagram representing a method of master migration according to one embodiment of the invention.

When a master device leaves a hub-and-spoke network such as Bluetooth piconet, the network connection among all devices vanishes, and no remaining devices can communicate with each other. In order to provide a persistent network, master migration is provided for. As shown in FIG. 4, an original master quits the network, step 400. When this event is detected in the PP2P layer of a device, the device deletes the master identity from the session table, step 410. The next device listed in the session table then assumes the master role, step 420. All devices in the PP2P network should have identical copies of the session table, so there should be no ambiguity as to which device is the next one to assume the master role. Other devices attempt to make a connection to the new master at the top of their session tables. This new master sends a session table update to all remaining devices in the network, step 430. The slave devices each store a local copy of the updated session table.

Slave device B 512 detects that it is now the first entry in the ordered list in its local copy of the session table. As shown in FIG. 5d, the new master adds a large increment to the update value, producing new session table 548, in the exemplary implementation, this increment is 100. The new update value 548, together with the ordered list of devices 552 (B, C, D) is sent as an update to slaves C 514 and D 516 after they detect that A 510 has left the network and connect to B 512 as master. If one of the slaves does not connect within a certain predefined period, then the master removes that slave from the session table. This predefined period, in one embodiment, is 20 seconds.

Slaves may make multiple attempts to connect to the new master. This is in order to prevent the situation in which a slave attempts to connect to a new master before the new master has detected the absence of the old master in the system. The time period reserved for making multiple connect attempts during master migration should be set to cover the time taken for a disconnect event to propogate and be processed by all devices. This predefined period, in one embodiment, is 10 seconds.

Network fragmentation may occur. For example, if a master is physically located such that all slave devices are in range. If that master leaves the network and a slave becomes master that cannot communicate to all devices, because some are out of range, slaves that cannot reach the new master will form a new network with the first master they can connect to.

The update value increment upon master migration (in the exemplary embodiment, an increment of 100) is larger the normal increment (in the example, an increment of one). Since participants in the PP2P network identify the most recent version of the session table based on which one has the highest update counter value, this procedure ensures that the session table sent by the new master will always be understood by the slaves as the most up-to-date version of the table—even in the "race condition" where the slaves received updates from the old master at about the same time that the migration was occurring.

If a slave connects to a master just as the master exits the network, the slave may not yet receive the session table update. In such a case, the PP2P layer at the slave reports the failure to connect to the application layer, and the application may choose to attempt to reconnect.

If a slave's attempt to connect to a new master fails after some delay and retrial, then the slave assumes that the new master has exited the network at the same time as the old master. The slave then deletes the second master from the session table and retries with the next device in the session table. The fallback position will be for a slave to become the master itself, since at some point, the slave will delete all device IDs listed before its own ID in the session table.

In order to avoid the situation in which a new master device has an outdated session table (for example, if a session table update was sent by a prior master but not received at the new master) when a slave device becomes master, it adds a large increment to the update value. When a slave device receives a session table update, it updates its copy of the session table only if the update value in the received session update table is larger than the one in its current session update table.

Master Migration Due to "Become Master" Request

In certain cases in a PP2P network, it may be useful to change which device is the master device in the underlying piconet network even when the current master is still present. For example, a network game using the PP2P network might route text chat message between players on a peer-to-peer basis, but route game logic and updates through a game host device which is responsible for providing the definitive game state description. In this scenario, it would be preferable for the master device to be the game host device.

A slave device can take this control by sending a "Become Master" request to the current master. The master device moves the identity of the slave device making the request to the first position in the ordered list in its session table and sends a session table update to each slave. It continues to route the data that is sent to it to the recipient devices, but accepts no further connections and makes no further session table updates. When all slaves have disconnected from it, it becomes a slave itself and connects to the new master device.

When slave devices (including the slave that sent the "Become Master" request) receive a session table update from a master which is not identified as the first device in the session table, they disconnect from the old master and attempt to connect to the device listed first in the session table (or becomes the master device, if it is the device listed first). If the slave device that sent the "Become Master" request becomes unavailable after it sends the request, after a delay, all devices will treat the second device on the session table ordered list as master. This will be the previous master, and the network will reconfigure back to the state before the "Become Master" was sent (with the exception of an increased session table update value).

CONCLUSION

As mentioned above, while exemplary embodiments of the present invention have been described in connection with various computing devices and network architectures, the underlying concepts may be applied to any computing device or system in which it is desirable to implement cooperative scheduling of hardware resource elements. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for providing master migration for a persistent operable peer-to-peer connection among each of three or more devices, where the three or more devices operate according to a protocol in which a first device from among the three or more devices is designated as a master device, and each other device from among the three or more devices is designated as a slave device, where each of said devices designated as a slave device communicates only with the device designated as master device, and, where each of said three or more devices stores a session table comprising the identities of each of said devices, said method comprising:
   detecting that said first device designated as master device has ceased communication;
   connecting as master device to other devices from among the three or more devices designated as slave devices; and
   causing each device from among said devices designated as slave devices to delete said identity of said first device from said session table.

2. The method of claim 1, where said step of connecting as master device to other devices from among the three or more devices designated as slave devices comprises:
   connecting as master device if said stored session table indicates designation as master device.

3. The method of claim 2, where said session table comprises an ordered list of identities of each of said devices, and where said step of connecting as master device if said stored session table indicates designation as master device comprises:
   determining the identity of the new master device by determining which of said devices appears first in said ordered list of identities.

4. The method of claim 1, where said session table further comprises an update value, said method further comprising:
   updating said session table by incrementing said update value; and
   sending said updated session table to each of said devices designated as a slave device.

5. A method for providing master migration for a persistent operable peer-to-peer connection among each of three or more devices, where the three or more devices operate according to a protocol in which a first device from among the three or more devices is designated as a master device, and each other device from among the three or more devices is designated as a slave device, where each of said devices designated as a slave device communicates only with the device designated as master device, and where each of said three or more devices comprises a session table comprising the identities of each of said devices, said method comprising:
   sending a migration command to said first device designated as a master device;
   acting as a master device; and
   receiving a session table update.

6. The method of claim 5, where said step of acting as a master device comprises:
   connecting as master device if said stored session table indicates designation as master device.

7. A method for providing master migration for a persistent operable peer-to-peer connection among each of three or more devices, where the three or more devices operate according to a protocol in which a first device from among the three or more devices is designated as a master device, and each other device from among the three or more devices is designated as a slave device, where each of said devices designated as a slave device communicates only with the device designated as master device, and where each of said three or more devices stores a session table comprising the identities of each of said devices, comprising:
   receiving a migration command from a second device designated as a slave device;
   sending information to said devices designated as slave devices indicating that said second device is newly designated as a master device by
   causing each device from among said devices designated as slave devices to modify said session table stored in said device.

8. The method of claim 7, where said session table comprises an ordered list of identities of each of said devices, and where said step of causing each device from among said devices designated as slave devices to modify said session table stored in said device comprises:
   sending an updated session table with said second device appearing first in said ordered list of identities.

9. A first device that participates in communication with two or more second devices, each of the first and second devices being adapted to engage in communication using an underlying master/slave topology, either the first device or one of the second devices being designated at any point in time as the master, the device comprising:
   a protocol engine that receives a request to send data to one of the second devices and uses the hub-and-spoke topology to carry out the request by either: (1) sending the data directly to said one of the second devices, if said first device is designated as the master, or (2) sending the data to the device that is designated as the master with information that indicates that the master is to forward the data to said one of the second devices, if said first device is not designated as the master; and
   data storage which stores a session table that indicates which of the devices is designated as the master, wherein the protocol engine determines which device is the master by consulting the session table.

10. The first device of claim 9, where the session table comprises an ordered list of device identities, and where the protocol engine determines which device is the master by consulting the session table and determining which device identity appears first in said list of device identities.

11. The first device of claim 9, where the session table comprises an update value, and where the first device further comprises:
   an update session table engine which receives a session table update, determines if said session table update is newer than said session table in said data storage, and if so, updates said session table in said data storage according to said session table update.

12. The first device of claim 9, wherein the first device detects that a connection to the master has been lost and consults the session table to determine which of the devices will become the master.

13. The first device of claim 12, wherein the session table indicates that the first device will become the master, and wherein the protocol engine:
   creates a new session table indicating that the first device is the new hub;
   stores said new session table in said data storage;
   waits for at least one of the second devices to connect to the first device; and
   sends said new session table to each device that connects to the first device.

14. The first device of claim 13, wherein the new session table includes an update counter, and wherein the protocol engine:
   sets said update counter in said new session table to a value that is higher than the value that could have been created for session tables by the master with which connection was lost.

15. The first device of claim 12, wherein the session table indicates that a designated one of the second devices will become the master, and wherein the protocol engine:
   initiates a connection with said designated one of the second devices; and
   receives a new session table from said designated one of said second devices.

16. The first device of claim 9, wherein the protocol engine sends an message to said device designated as master indicating that the first device is to assume the role of the master, whereupon said master device sends a message to said first and second devices to drop their respective connections to the device that is currently designated as the master, upon which said second devices initiate new connections to the first device as a new master; and
   where said first device further comprises data storage which stores a session table that indicates which of the devices is designated as the master, wherein the protocol engine determines which device is the master by consulting the session table, and where said a message to said first and second devices to drop their respective connections to the device that is currently designated as the master is session table update.

\* \* \* \* \*